United States Patent
Wong

(10) Patent No.: US 8,869,174 B2
(45) Date of Patent: Oct. 21, 2014

(54) METHOD AND APPARATUS FOR PROVIDING CONTEXT AWARE LOGGING

(71) Applicant: McKesson Financial Holdings, Hamilton (BM)

(72) Inventor: Eldon Wong, Vancouver (CA)

(73) Assignee: McKesson Financial Holdings, Hamilton (BM)

( * ) Notice: Subject to any disclaimer, the term of this patent is extended or adjusted under 35 U.S.C. 154(b) by 0 days.

(21) Appl. No.: 13/705,869

(22) Filed: Dec. 5, 2012

(65) Prior Publication Data

US 2014/0157288 A1 Jun. 5, 2014

(51) Int. Cl.
*G06F 9/54* (2006.01)
*G06F 19/00* (2011.01)

(52) U.S. Cl.
CPC .............. *G06F 9/542* (2013.01); *G06F 19/321* (2013.01)
USPC ............................. 719/318; 382/128; 382/131

(58) Field of Classification Search
CPC ....................................................... G06F 9/542
USPC .......................................................... 719/318
See application file for complete search history.

(56) References Cited

U.S. PATENT DOCUMENTS

| | | | |
|---|---|---|---|
| 8,311,791 B1 * | 11/2012 | Avisar | 703/11 |
| 2005/0278728 A1 * | 12/2005 | Klementiev | 719/328 |
| 2006/0005132 A1 * | 1/2006 | Herdeg, III | 715/704 |
| 2008/0141221 A1 * | 6/2008 | Benesovska et al. | 717/124 |
| 2008/0229283 A1 * | 9/2008 | Nelson | 717/124 |
| 2008/0235256 A1 * | 9/2008 | Sridhar | 707/102 |
| 2009/0150898 A1 * | 6/2009 | Sohn et al. | 718/105 |
| 2012/0159324 A1 * | 6/2012 | Chavez et al. | 715/704 |
| 2012/0329029 A1 * | 12/2012 | Rauta | 434/350 |

OTHER PUBLICATIONS

Kalet, A.; Coady, S.; Hopkins, M.; Hochberg, M.; Riles, T., "Preliminary evaluation of the Web Initiative for Surgical Education (WISE-MD)" (Jul. 2007), The American Journal of Surgery, vol. 194, Issue 1, pp. 89-93 [retrieved from http://www.sciencedirect.com/science/article/pii/S0002961007002048].*

O'Toole, R.; Playter, R.; Krummel, T.; Blank, W.; Cornelius, N.; Roberts, W.; Bell, W.; Raibert, M., "Assessing skill and learning in surgeons and medical students using a force feedback surgical simulator" (1998), MICCAI'98 Lecture Notes in Computer Science, pp. 899-909 [retrieved from http://link.springer.com/chapter/10.1007/BFb0056278#].*

* cited by examiner

*Primary Examiner* — Brian W Wathen
(74) *Attorney, Agent, or Firm* — Alston & Bird LLP

(57) ABSTRACT

A method, apparatus and computer program product are therefore provided to enable context aware logging. In this regard, the method, apparatus, and computer program product may record events that occur in one or more applications, where the events are due to user input. These events may be associated with time values and data describing application contexts, such that the events may be used to generate an input log that also records application semantics and statuses. A variety of operations may be performed using this input log, including recreation of an application state by playing back the log, the ability to suspend or resume a user session, the ability to perform undo or pause operations, the ability to analyze user inputs to train or audit users, testing of users, troubleshooting of errors, and enabling multi-user collaboration.

17 Claims, 12 Drawing Sheets

METHOD AND APPARATUS FOR PROVIDING CONTEXT AWARE LOGGING

TECHNOLOGICAL FIELD

An example embodiment of the present invention relates generally to logging input operations and, more particularly, to a method and apparatus for tracking application context information when logging input operations.

BACKGROUND

One of the primary uses of modern electronics is to allow for easy viewing, editing, and saving of data in a digital form. Applications allow users to modify documents, images, and other files using input devices such as keyboards, mice, and touch screens. As these applications have grown more sophisticated, the way in which user inputs are processed has become more complex. Modern applications provide users with the ability to revert most recent actions (e.g., an "undo" operation) to correct input errors immediately after the errors occur. Some applications, such as macro recording programs, allow for direct recording of user input for later playback. In this manner, the user may record a sequence of particular input operations (e.g., mouse clicks at a particular screen location) for later playback to automate certain tasks.

However, known methods of tracking user input typically rely on data received directly from the input device (e.g., screen coordinates and mouse-click operations) or, at best, these programs track individual commands resulting from multiple input operations (e.g., an undo operation removing the most recently typed phrase in a word processor). In many cases, these input operations are lost when the individual user session is terminated.

In the particular case of medical imaging, a user may perform several operations on a given image in the course of a given exam. A particular image may be moved, panned, zoomed, had the contrast adjusted, annotated, measured, and the like over a period of time as the medical practitioner completes their analysis. The same image may be reviewed multiple times in this manner, resulting in dramatic modification to the image. Furthermore, the order in which these operations are performed and the relative time between operations may be directly relevant to the final product.

The final version of the image may be different in many respects from the original image, and the steps used to arrive at the final image may be lost when the user session is terminated, despite the fact that valuable information can be derived from the analysis process. For example, the actions taken by a radiologist when reviewing a computer aided tomography (CAT) scan image may be highly relevant as to whether the radiologist is likely to find a particular abnormality. Short of having another individual standing over the user's shoulder evaluating their performance, the current state of the art fails to provide any method for training, evaluation, or feedback of the process, rather than the finished product. Furthermore, such methods also fail to provide the ability to learn from user input operations over time, for the purpose of altering and improving usability of the interface.

BRIEF SUMMARY

A method, apparatus and computer program product are therefore provided according to an example embodiment of the present invention in order to provide context aware logging. In this regard, the method, apparatus, and computer program product of an example embodiment may record events that occur in one or more applications, where the events are due to user input. These events may be associated with time values and data describing application contexts, such that the events may be used to generate an input log that also records application semantics and statuses. A variety of operations may be performed using this input log, including recreation of an application state by playing back the log, the ability to suspend or resume a user session, the ability to perform undo or pause operations, the ability to analyze user inputs to train or audit users, testing of users, troubleshooting of errors, and enabling multi-user collaboration.

Example embodiments may include a method for providing context aware logging. The method may include receiving a notification of at least one application event from an application, the application event occurring in response to a user input to the application, and the notification comprising an event type and at least one application context related to the application event, receiving a time value associated with the application event, and converting, using a processor, the notification and the time value into an entry in an input log. The application may be a medical imaging application. The application context may include data indicating the state of the application pertaining to the particular event type. The method may further include extracting one or more notifications and time values from the input log, determining an event and an event context for execution based on the one or more extracted notifications and time values, generating an instruction for the application comprising the event and the event context, and sending the event to the application for execution. The method may also include selecting at least one notification stored in the input log, and skipping the selected notification when extracting the one or more notifications and time values.

The method may further include determining a set of training semantics based on the input log, and providing the training semantics to a user during playback of the input log. The input log may be a known correct input log, and the method may further include recording a test input log, identifying deviations between the test input log and the known correct input log, and evaluating the test input log based on the identified deviations. Evaluating the test input log may include generating a score report based on scoring values assigned to the events and event contexts of the known correct input log. The method may further include identifying reference materials based on the identified deviations, and providing the reference materials as part of the score report. The method may also include receiving a plurality of additional input logs, each of the plurality of input logs comprising a plurality of notifications and time values, and analyzing the plurality of additional input logs to determine a set of user analytics, the user analytics identifying the frequency with which at least one of events and event contexts occur across the plurality of additional input logs. The method may further include transmitting the input log to a remote computer for playback. In some embodiments, the method may include identifying at least one event in the input log as collaboration-locked, and avoiding transmission of the collaboration-locked event in the input log transmitted to the remote computer for playback. The input log may be generated by generating an event for the notification, wherein the event comprises the event type and at least one application context from the notification, associating the time value with the event, determining at least one event action using the at least one application context, determining at least one action context using the at least one application context, and storing the event, the time value, the at least one event action, and the at least one action context in the input log.

Example embodiments may further provide an apparatus. The apparatus may include processing circuitry configured to receive a notification of at least one application event from an application, the application event occurring in response to a user input to the application, and the notification comprising an event type and at least one application context related to the application event, to receive a time value associated with the application event, and to convert the notification and the time value into an entry in an input log. The processing circuitry may be further configured to generate an event for the notification, wherein the event comprises the event type and at least one application context from the notification, to associate the time value with the event, to determine at least one event action using the at least one application context, to determine at least one action context using the at least one application context, and to store the event, the time value, the at least one event action, and the at least one action context in the input log. The apparatus may be a medical imaging device.

In some embodiments, the processing circuitry is further configured to extract one or more notifications and time values from the input log, to determine an event and an event context for execution based on the one or more extracted notifications and time values, to generate an instruction for the application comprising the event and the event context, and to send the event to the application for execution. The processing circuitry may be further configured to transmit the input log to a remote computer for playback.

Yet further example embodiments may include a method. The method may include receiving an input log, the input log comprising one or more events and application contexts relating to input performed on a remote computer, determining, using a processor, at least one event and at least one event context for execution from the input log, generating one or more instructions based on the at least one event and at least one event context, and executing the generated one or more instructions to cause an application to perform the input originally performed on the remote computer. The method may further include generating an instruction for the application comprising the event and the event context, and sending the event to the application for execution.

BRIEF DESCRIPTION OF THE DRAWINGS

Figure 1:
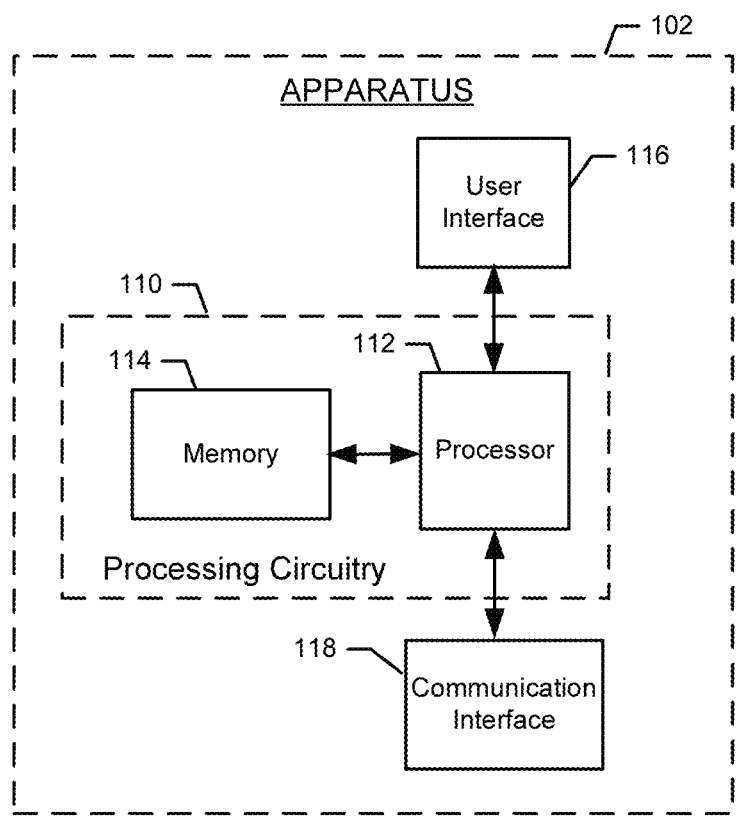
Figure 2:
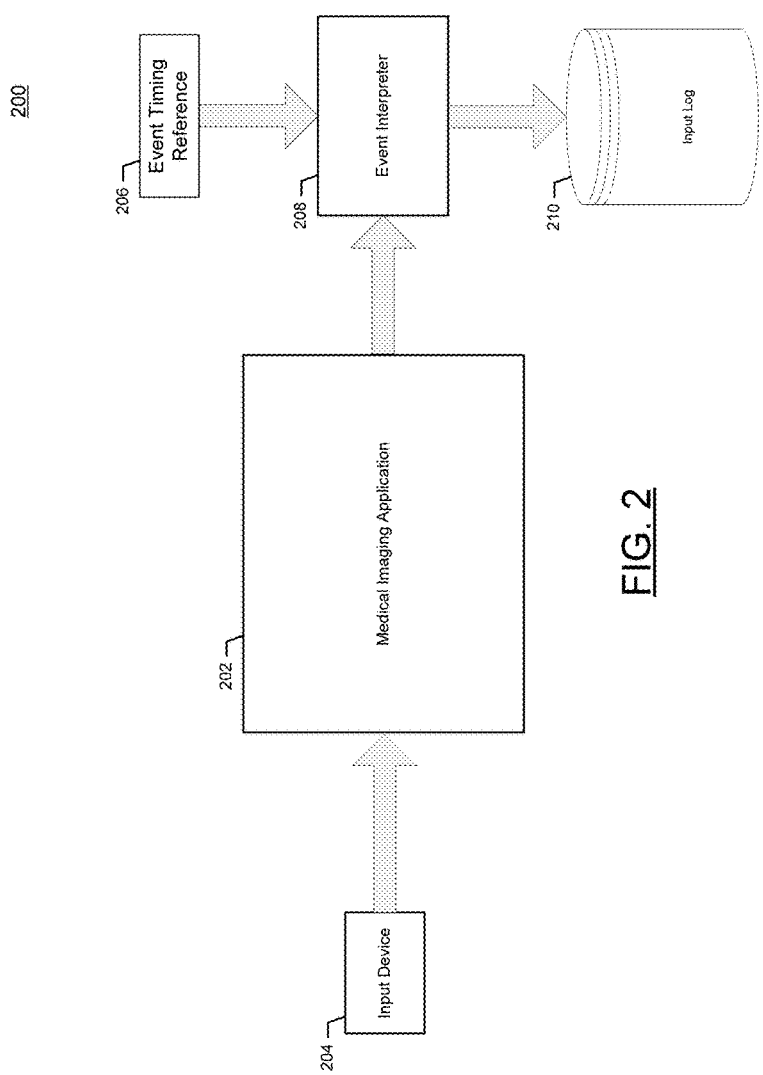
Figure 3:
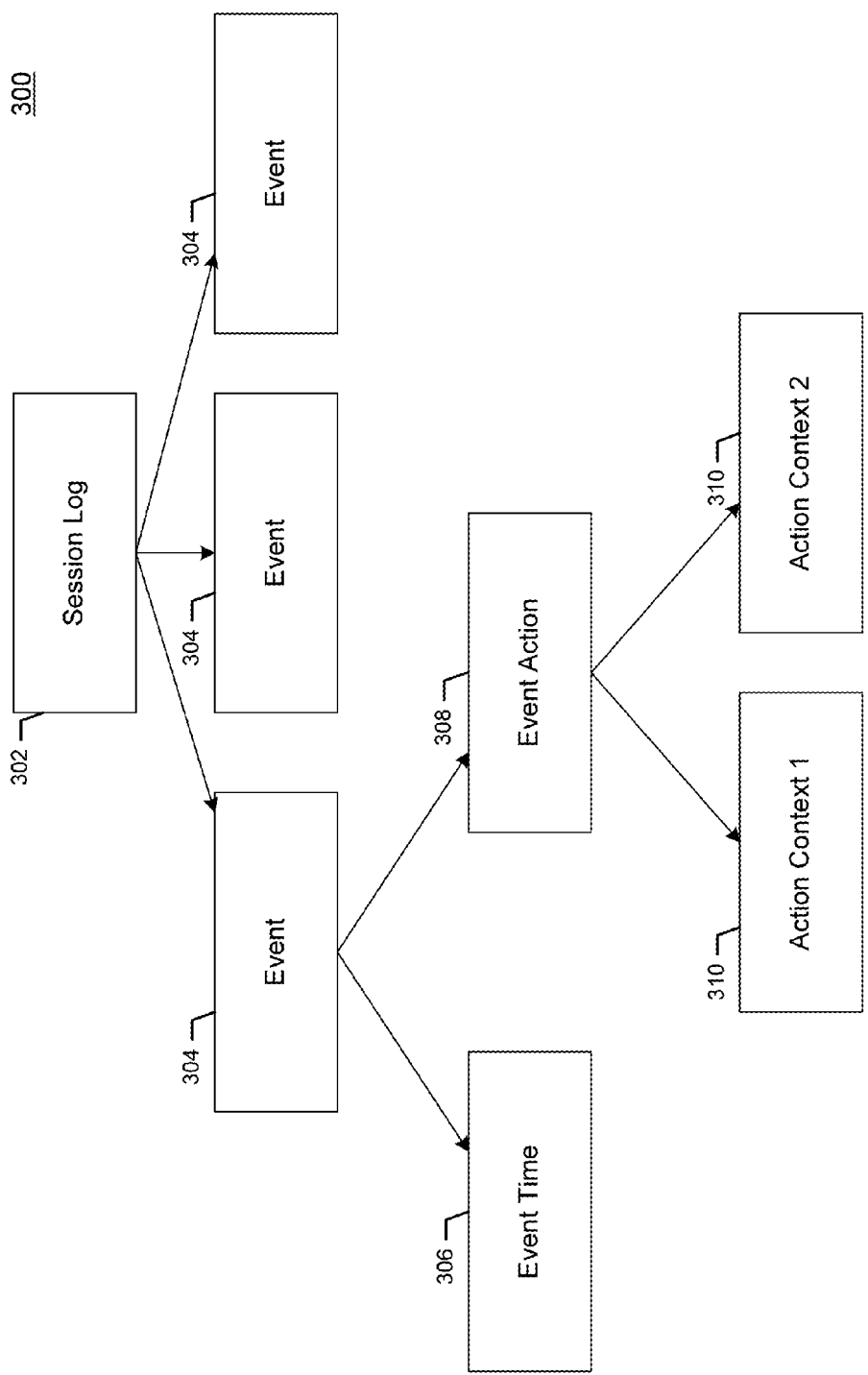
Figure 4:
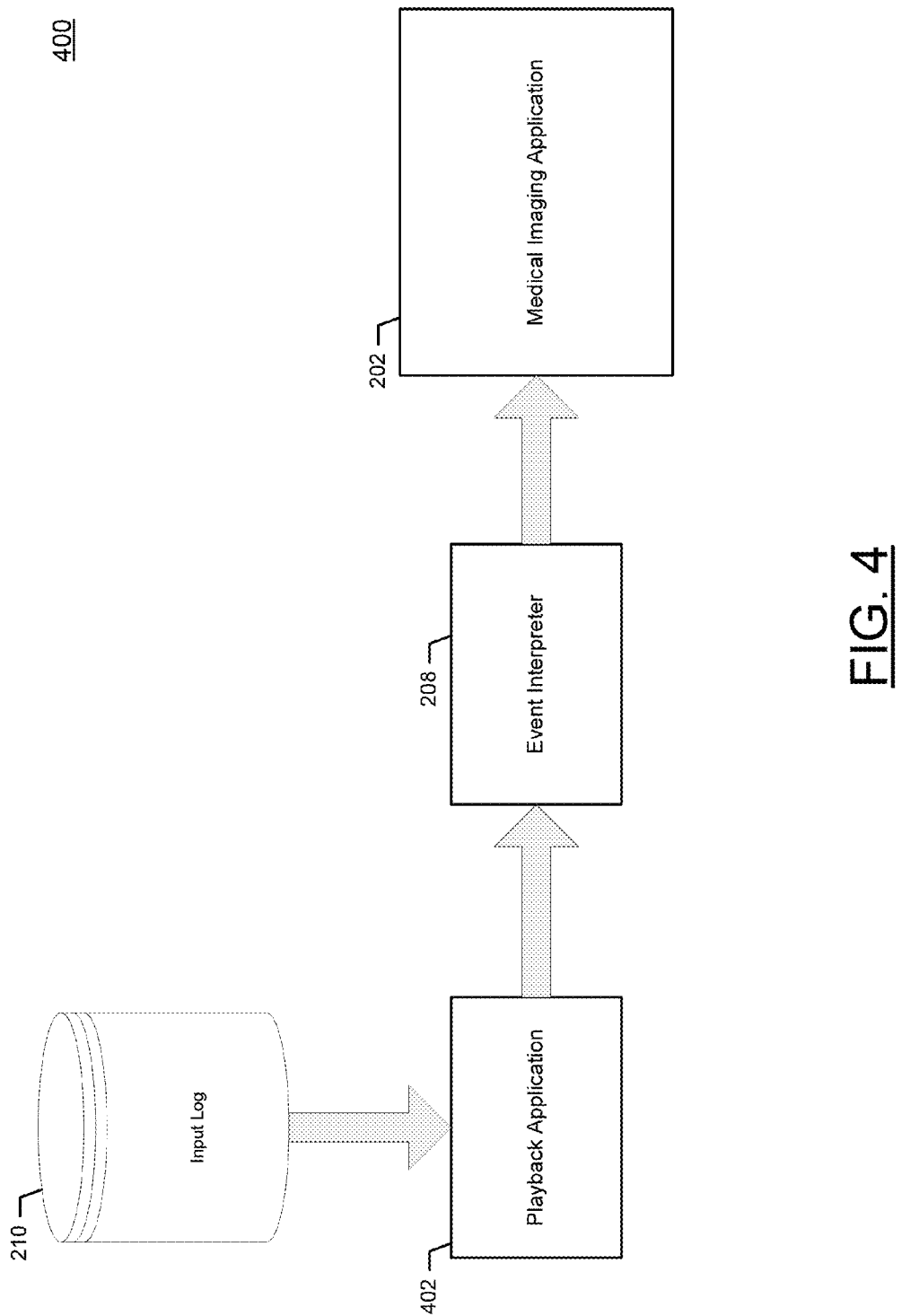
Figure 5:
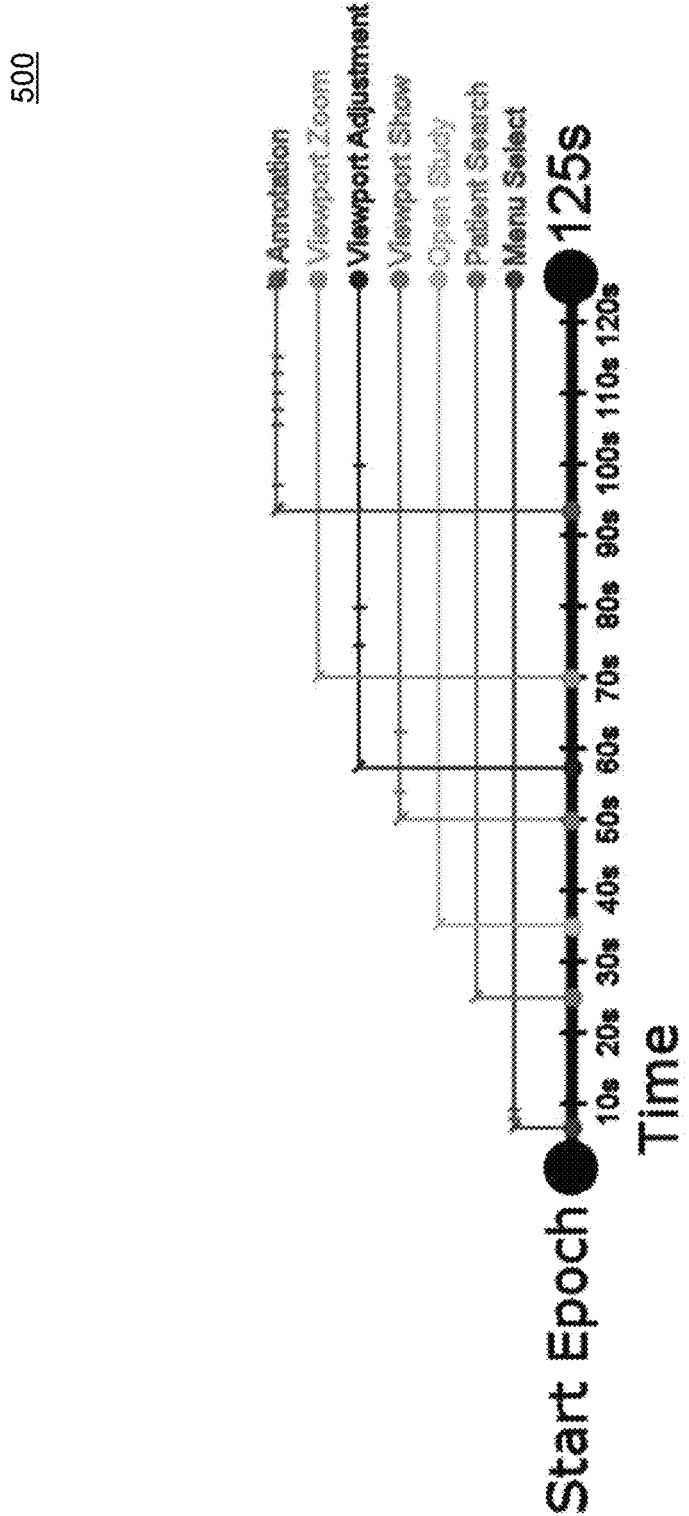
Figure 6:
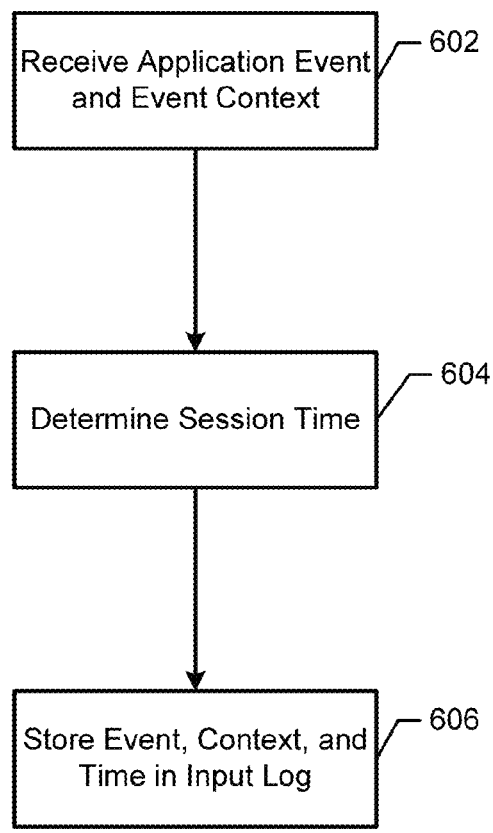
Figure 7:
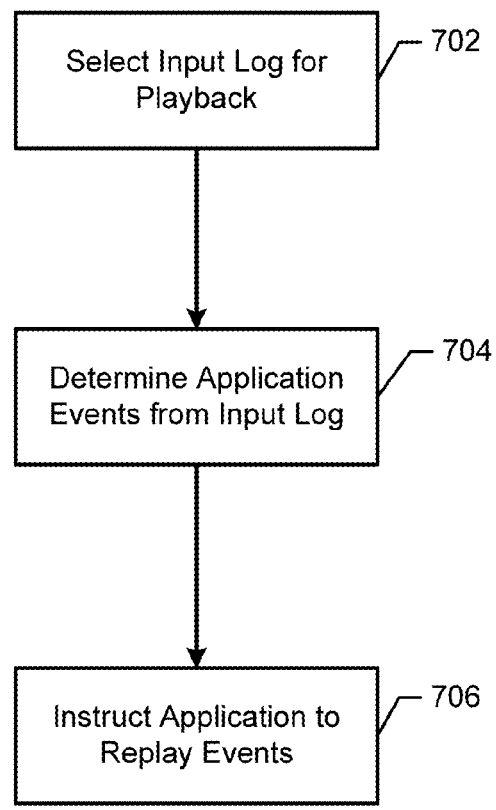
Figure 8:
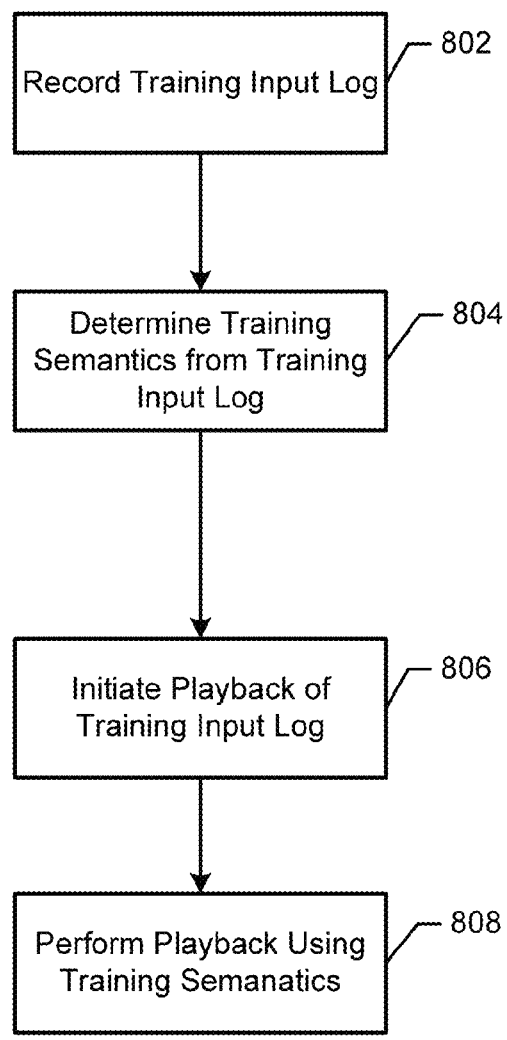
Figure 9:
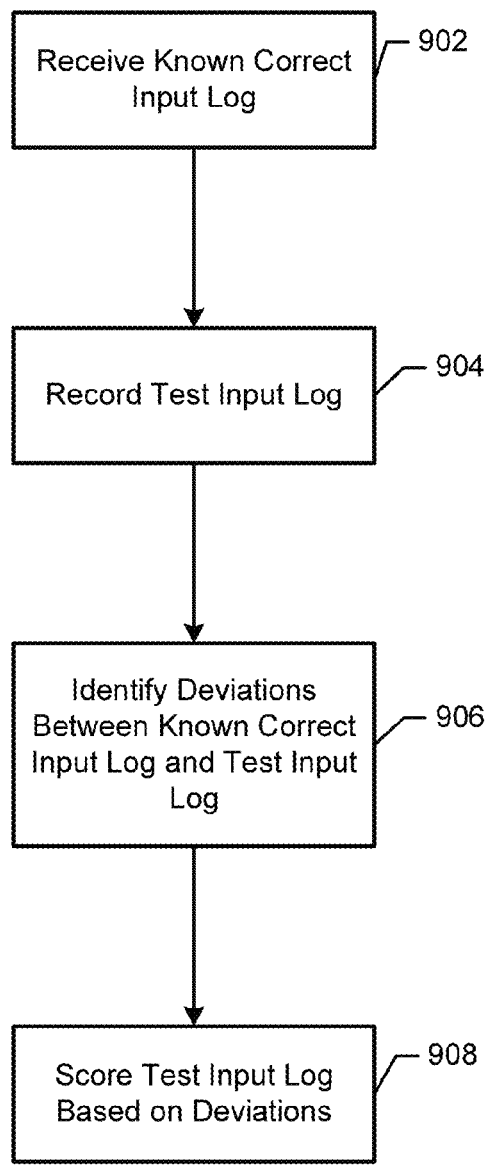
Figure 10:
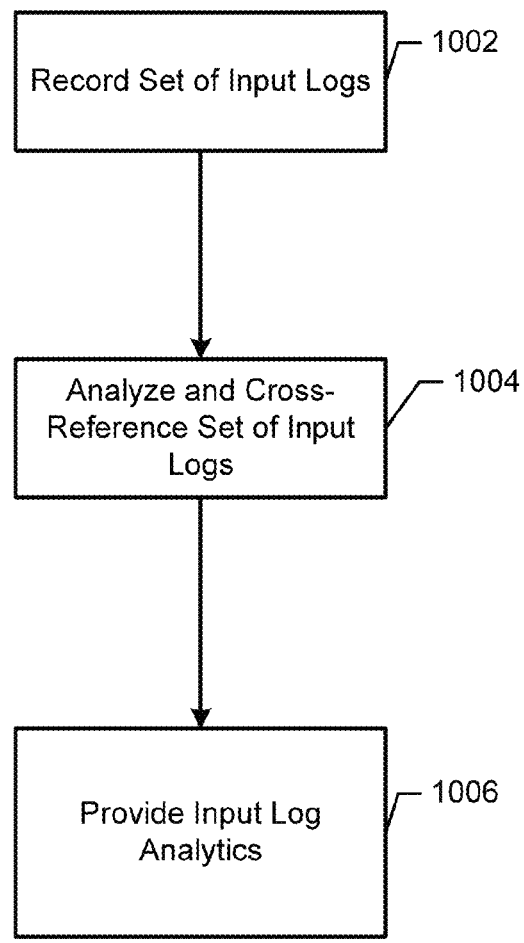
Figure 11:
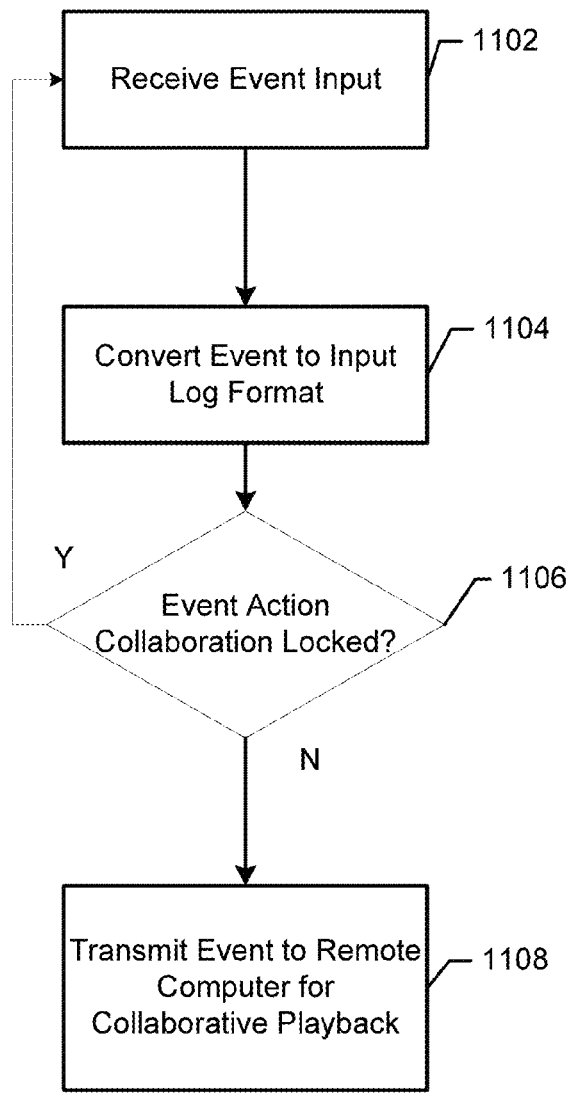
Figure 12:
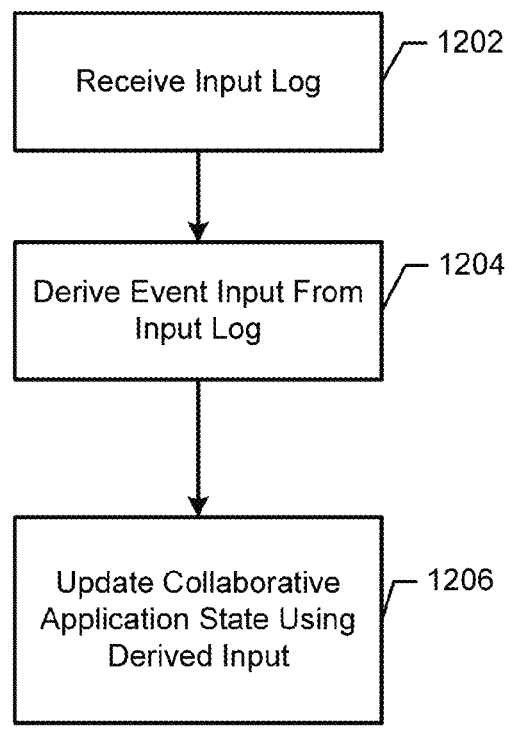

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a block diagram of a process flow for recording an input log in accordance with an example embodiment of the present invention;

FIG. 3 is a structural diagram depicting an example of an input log in accordance with an example embodiment of the present invention;

FIG. 4 is block diagram of a process flow for playing back an input log in accordance with an example embodiment of the present invention;

FIG. 5 is a timeline view of an input log in accordance with an example embodiment of the present invention;

FIG. 6 is a flow diagram depicting an example method for recording an input log in accordance with an example embodiment of the present invention;

FIG. 7 is a flow diagram depicting an example method for playback of an input log in accordance with an example embodiment of the present invention;

FIG. 8 is a flow diagram depicting an example method for performing a training operation using an input log in accordance with an example embodiment of the present invention;

FIG. 9 is a flow diagram depicting an example method for performing a testing operation using an input log in accordance with an example embodiment of the present invention;

FIG. 10 is a flow diagram depicting an example method for deriving input analytics from one or more input logs in accordance with an example embodiment of the present invention;

FIG. 11 is a flow diagram depicting an example method for receiving collaboration input using an input log in accordance with an example embodiment of the present invention; and FIG. 12 is a flow diagram depicting an example method for providing collaboration among multiple devices using a collaboration input in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are provided in accordance with an example embodiment of the present invention in order to provide context-aware logging of user input. In this regard, a method, apparatus and computer program product of an example embodiment may receive user input, and determine one or more application events from the user input. Application events may be stored along with a time reference value for each application event to generate an application log. The application log may be used for a variety of purposes, including but not limited to playback of the log for resuming an activity, reviewing the log for training, testing, or auditing purposes, enabling collaboration using logged input, or the like.

FIG. 1 illustrates a block diagram of an apparatus 102 in accordance with some example embodiments. The apparatus 102 may be any computing device configured to receive application events for logging operations. In some particular embodiments, the apparatus 102 may be configured to perform or otherwise assist with medical diagnostic and/or imaging operations. For example, the apparatus 102 may be implemented on a computing device that may be configured to access and display images stored in a Digital Imaging and Communications in Medicine (DICOM) format. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 in order to carry out the functionality associated with each respective application. In some cases, the memory 114 may be in communication with one or more of the processor 112, user interface 116, or communication interface 118 via a bus or buses for passing information among components of the apparatus 102.

The user interface 116 may be in communication with the processing circuitry 110 to receive an indication of a user input at the user interface 116 and/or to provide an audible, visual, mechanical or other output to the user. As such, the user interface 116 may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms. In embodiments in which the apparatus 102 is implemented on a server, aspects of the user interface 116 may be limited, or the user interface 116 may even be eliminated.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

FIG. 2 is a block diagram of a process flow for recording an input log in accordance with an example embodiment of the present invention. The process flow 200 depicts a series of communications that result in inputs received from an input device 204 being used to generate an input log 210 that includes application semantics and timing information in addition to a set of events. The input device 204 generates user inputs that are received by a medical imaging application 202. The input device 204 may be any input device as known in the art, such as a mouse, a keyboard, a touch screen, a joystick, a gesture tracking device, a camera, or the like. Input received from the user by the input device 204 may be converted into signals for processing by the medical imaging application 202. For example, a keyboard input device may notify the medical imaging application 202 that the user is pressing particular keys. In some embodiments, signals from the input device 204 may be interpreted by drivers, libraries, operating system components, or the like before transmission to the medical imaging application 202.

The medical imaging application 202 may be any software application used for viewing, capturing, and/or analyzing an image. The medical imaging application 202 may load an image from memory or a capture device, and allow manipulation and viewing of the image on a display screen. As inputs are received from the input device 204, the medical imaging application 202 may convert the inputs into particular events. For example, a mouse click and drag operation may be converted into a scroll or resize operation performed on the medical image. The events may include any aspect of the user interaction with the application, including but not limited to zooming, scrolling, or annotating the image. The events may also capture configuration settings and changes (e.g., modifying an image contrast), or file access operations (e.g., opening, closing, or saving a file).

These events may be received by an event interpreter 208. For example, the medical imaging application 202 may register with an event application programming interface (API) that notifies the event interpreter of events occurring in the medical imaging application 202. Alternately, the event interpreter may insert hooks or other callbacks into the medical imaging application 202 to track the occurrence of events. As yet another alternative, the event interpreter may monitor the input device directly and track which applications are executing, and associate particular inputs with events that the inputs would cause or are likely to cause in the executing application. In this manner, the event interpreter 208 may store application elements other than the raw input provided by the input device 204. For example, the event interpreter 208 may track application contexts and semantics (e.g., particular windows, images, application controls, and the like) that are the target and result of the input operations, rather than the input itself. The event interpreter may also track other data, such as application version information, operating system version or configuration information, display or device settings (e.g., brightness and contrast values on a display device), or the like. Tracking of this information allows for more robust review, modification, manipulation, and feedback of the input logs, some example uses of which are described below with respect to FIGS. 6-12.

The event interpreter 208 may receive time information from an event timing reference 206. The event timing reference 206 serves to provide the event interpreter 208 with timestamp values that allow for events to be associated with a single time frame of reference. For example, the event timing reference 206 may be a system clock or other hardware or operating system reference, or the event timing reference 206 may be part of the event interpreter 208 itself. In some embodiments, the event timing reference 206 may be provided by one or more applications monitored by the event interpreter 208, such as the medical imaging application 202.

The event interpreter 208 functions to generate an input log 210. The input log 210 may include a list of events and events, event times, actions, and contexts for the events registered by the medical imaging application 202 in response to the input received from the input device 204. The input log 210 may be stored locally, such as on a hard drive, in system memory, or on other volatile or non-volatile storage. Additionally or alternatively, the input log 210 may be stored on a network computer, such as a database server or on a cloud storage system. The input log 210 may be stored as a series of events associated with time index values provided by the event timing reference 206. An example embodiment of an input log 210 is described further below with respect to FIG. 3.

Turning now to FIG. 3, FIG. 3 is a structural diagram depicting an example of an input log 300 in accordance with an example embodiment of the present invention. The input log 300 may include a log of one or more sessions, known as session logs 302. For example, the input log 300 may include a separate session for each file opened on a logged application, a new session log 302 may be created every time the application is closed and reopened, and/or a session log 302 may be associated with a particular user account.

Each session log 302 may be associated with a plurality of events 304. The events 304 may relate to various actions and operations performed within the application that is associated with the input log 300. Example events that may be associated with a medical imaging application might include opening an image file, beginning a dictation, changing a display contrast, zooming on a particular portion of the image, annotating the image, or the like. Each time one of these events is performed by the user, a new event 304 may be added to the input log.

The events 304 may be comprised of an event time 306 and one or more an event actions 308. The event time 306 may be an absolute time (e.g., a time of day) or a relative time (e.g., a particular number of seconds since beginning the session). As described with respect to FIG. 2, the event time 306 may be provided by an event timing reference. The event action 308 may describe the action performed by the event (e.g., a zoom, scroll, or contrast change operation). Each of the event actions 308 may also be associated with one or more action contexts 310. The action contexts 310 may define particular features, properties, targets, triggers, or objects associated with the event. For example, an event may be associated with a context of a particular application window, a particular image, a particular interface control, a particular input operation, or the like. As with the event action itself, these contexts may be provided by the application for which the event is recorded. Event contexts may also provide other information about the event, such as whether the event is distinct (e.g., it occurs at a single point of time and completes), continuous (e.g., the event begins at a first point in time and continues until a second point in time), destructive (e.g., unable to resume), non-stackable (e.g., not able to be undone), or the like. The event contexts may further include configuration or setting information, such as brightness or contrast settings, sensor input settings (e.g., input from a microphone indicating that the user is speaking, or input from a video camera indicating an ambient light level), or the like.

As an example input log, a series of events associated with a patient x-ray diagnosis might take the following format:

TABLE 1

| SESSION_LOG | START EPOCH | DURATION |
|---|---|---|
| JSMITH_PACS_USE | [SE] | 125 s |

| ACTION | TYPE | TIME STREAM |
|---|---|---|
| MENU_SELECT | DISTINCT | JSMITH_PACS_USE |
| PATIENT_SEARCH | DISTINCT | JSMITH_PACS_USE |
| OPEN_STUDY | DISTINCT | JSMITH_PACS_USE |
| VIEWPORT_SHOW | DISTINCT | JSMITH_PACS_USE |
| VIEWPORT_ADJ_LAYOUT | DISTINCT | JSMITH_PACS_USE |
| VIEWPORT_ZOOM | DISTINCT | JSMITH_PACS_USE |
| VIEWPORT_ADJ_CONTRAST | DISTINCT | JSMITH_PACS_USE |
| VIEWPORT_ADJ_BRIGHTNESS | DISTINCT | JSMITH_PACS_USE |
| VIEWPORT_ADJ_SCROLL | DISTINCT | JSMITH_PACS_USE |
| ANNOTATE_DISTANCE | DISTINCT | JSMITH_PACS_USE |
| ANNOTATE_DRAWING | DISTINCT | JSMITH_PACS_USE |
| ANNOTATE_TEXT | DISTINCT | JSMITH_PACS_USE |

| CONTEXT | TIMEPOINT | ACTION |
|---|---|---|
| MODULES | [SE] + 5 s | MENU_SELECT |
| TOOLS | [SE] + 7 s | MENU_SELECT |
| SEARCH | [SE] + 9 s | MENU_SELECT |
| ABC | [SE] + 25 s | PATIENT_SEARCH |
| XYZ | [SE] + 35 s | OPEN_STUDY |
| LEFT - LEFT RIB | [SE] + 50 s | VIEWPORT_SHOW |
| CENTER - RIGHT RIB | [SE] + 55 s | VIEWPORT_SHOW |
| RIGHT - 4 × 4 | [SE] + 57 s | VIEWPORT_ADJ_LAYOUT |
| RIGHT - HEART | [SE] + 62 s | VIEWPORT_SHOW |
| LEFT - 200% | [SE] + 70 s | VIEWPORT_ZOOM |
| 80% | [SE] + 75 s | VIEWPORT_ADJ_CONTRAST |
| 50% | [SE] + 80 s | VIEWPORT_ADJ_BRIGHTNESS |
| LEFT - (5, 5) | [SE] + 93 s | ANNOTATE_DISTANCE |
| LEFT - (10, 7) | [SE] + 97 s | ANNOTATE_DISTANCE |
| RIGHT - BOTTOM | [SE] + 100 s | VIEWPORT_ADJ_SCROLL |
| RIGHT - (10, 2) | [SE] + 105 s | ANNOTATE_DRAWING |
| RIGHT - (16, 4) | [SE] + 107 s | ANNOTATE_DRAWING |
| RIGHT - (9, 3) | [SE] + 110 s | ANNOTATE_DRAWING |
| RIGHT - (11, 3) | [SE] + 112 s | ANNOTATE_DRAWING |
| RIGHT - (10, 2) | [SE] + 114 s | ANNOTATE_DRAWING |
| RIGHT - FOLLOW-UP | [SE] + 125 s | ANNOTATE_TEXT |

Table 1 depicts a set of actions that make up a session of an example input log, relating to a viewing of an X-ray image. The session includes multiple actions, and the actions are associated with particular contexts and times. For example, menu selection actions are performed on the modules, tools, and search menus at times 5 seconds, 7 seconds, and 9 seconds past the start epoch, respectively. Each action type may have different contexts associated with the action. For example, menu selection actions may be associated with particular menus, annotation actions may be associated with particular image locations and/or text or other input, zooming operations may be associated with a zoom level and a screen position, and the like. Actions may be further described as particular types, such as continuous or distinct, where continuous actions take place over a period of time while distinct actions take place at a single point in time. Although not pictured in the above table, events may also be associated with particular dependencies. For example, an event that requires editing a recording or annotating an image might require an image to be open to perform the event. The input log may also track these dependencies to ensure accurate recreation of the application environment upon event playback, in the event certain events are unselected or otherwise deactivated. For example, if an event is deactivated, this may cause deactivation of events that depend upon the deactivated event.

FIG. 4 is block diagram of a process flow 400 for playing back an input log in accordance with an example embodiment of the present invention. Once an input log has been created, the process flow 400 allows for a user to view and/or manipulate the events of the log. Playback of the input log may allow for recreation of an application state, or viewing of the steps taken by another user with respect to the application. The playback process flow may also be used by other applications to generate analytics and perform other analysis on the input logs.

In the instant example, the input log 210 is stored, such as in a device memory or on a database server. The input log may be associated with a particular data file or application instance. For example, the input log may be generated during viewing of a particular image file, and associated with that image file. A playback application 402 may access the input log 210 to recreate or analyze the events stored therein. In some embodiments, the playback application 402 may display the events via a user interface element. For example, the events may be presented as a timeline representation, or sorted in a table by event contexts or types. This user interface element may allow for selection of particular events to view the event and enabling or disabling of certain events for playback. In some embodiments, the user interface element may include controls for initiating playback, rewinding, or fast-forwarding of events stored the input log. The user interface element may also allow for selection of a particular point in time to begin event playback, such as by dragging an interface control on a timeline.

As the playback application reaches events in the input log 210 (e.g., as the events of the input log are played back over a time period defined in the input log), the playback application 210 may send the events to an event interpreter 208. The event interpreter 208 may receive the events from the playback application 210 and convert those events into commands for applications. For example, the input log may include events for a medical imaging application and a dictation application. As events occur relating to a dictation operation, the event interpreter 208 may send commands to the dictation application to recreate the events, and as events occur relating to manipulation of an image the event interpreter 208 may send commands to the medical imaging application. The event interpreter 208 may convert these events to raw device input (e.g., simulating user input on one or more input devices such as a mouse or keyboard), or as commands via an interface with the applications (e.g., an API for issuing application commands). In some embodiments, the event interpreter 208 may make adjustments for particular application versions, hardware/workstation configurations, work environment settings, or the like. For example, an older version of an application may have slightly different event semantics, and the event interpreter may be configured to convert events recorded by a newer version of the application to the semantics of the older version, and vice-versa. The same process may be performed based on the presence of lack of certain hardware or software (e.g., where the recording device has multiple monitors but the playback device does not). The event interpreter 208 may also have environmental awareness based on one or more sensors. For example, an input log may note that the user was initially operating in a low light environment based on recorded input from one or more light sensors, but playback may be performed in an environment with better lighting as registered by a sensor coupled to the playback device. In such an example, brightness or contrast settings might be automatically adjusted based on the changed light levels.

As described above, the playback application 402 may not send every event to the event interpreter. For example, if one or more events are disabled for playback, the playback application 402 may not send those events to the event interpreter 208 to command the associated applications. Although the instant example depicts the playback application 402, the event interpreter 208, and the medical imaging application 202, a single application or a different group of applications might perform the role of each of these modules in combination.

FIG. 5 is a timeline view 500 of an input log in accordance with an example embodiment of the present invention. The timeline 500 shows the events that occur for a particular session or input log with reference to a particular time value. In the instant example, the events are described in relation to a start epoch (e.g., the time at which recording began). In alternative or additional embodiments, the start time and event times may be determined by an absolute time, such as a timestamp acquired during the event logging. The events depicted in the example timeline each occur at a particular time in reference to the start epoch, such as 5 seconds after the epoch, 25 seconds after the epoch, 50 seconds after the epoch, and the like. As such, when playing back this example input log, events may be played back at the same time with reference to the beginning of the playback operation relative to the beginning of the recording operation that generated the input log. Although the instant timeline 500 depicts events occurring at a single time, a similar timeline could also be used to depict continuous events, such as events that begin at a first time and end at a second time (e.g., a recording operation). Such continuous events may be depicted as two entries on the timeline, representing the start and stop times.

FIG. 6 is a flow diagram depicting an example method 600 for recording an input log in accordance with an example embodiment of the present invention. Events can be triggered or detected automatically by some sort of listener (e.g., a programmatic event handler such as a programmatic hook that executes upon the event) or explicitly "created" in code when actions are performed in an application (e.g., when a user performs an action that is not associated with a listener). The type of event may be determined by a type of listener (e.g., which particular programmatic hook was triggered) or the component to which the event is applied, or through the design of the event itself (e.g., editing application code to explicitly record the event when the code for the event is triggered). Events may be added to the input log upon detection or after some normalization or processing. As an example, two touch screen events may occur one after another at a coordinate point (5, 0). Processing could be added to touch screen events to check that the previous event was not a touch screen event at the same coordinates. If this duplication was found, then the duplicate event might not be added to the input log. The reverse could be true as well, where the sample rate (e.g., the event fire rate) for something is lower than the actual value change rate. In this case, processing could occur on these events to fill-in values in the gaps before adding to the input log. As described above, events that occur in one or more applications may be tracked and stored, along with contextual information and time values. Events stored in this manner may generate an input log, such as described with respect to FIGS. 3 and 5.

At action 602, an application event is received. For example, an event interpreter may receive an indication from an application that a particular event has occurred, or the event interpreter may register a particular input operation being performed on a particular application. The event interpreter may identify that the event has occurred, which may indicate the event that is to be entered into the input log. The event interpreter may also receive contextual information about the event, such as one or more application states, objects related to the event (e.g., windows or interface controls), screen locations (e.g., absolute or relative screen coordinates), scalar values, or the like. The event may also be associated with a particular session, such as a particular application instance. In some embodiments, an input log is associated with one or more data files, such as audio or video images. For example, an input log may be associated with an image file where the input log represents input recorded during viewing and analysis of the image. As a further example, the input log may be associated with files other than the image, such as an audio file associated with a dictation performed when viewing the image. References to or copies of these files may be stored with the input log to enable accurate recreation of application states upon viewing, playback, and analysis of the input logs.

At action 604, the method determines a session time value for association with the event. For example, as described above, a time may be specified with reference to the start time of the log (e.g., a start epoch), or a timestamp received from a timing reference source. These time values may be used to reconstruct an order of events for review, analysis, and/or playback, such as by establishing a timeline as described with respect to FIG. 5. At action 606, the event, the event context, and the time are stored in an input log as described above. The input log may be saved for later review, playback, and/or analysis.

FIG. 7 is a flow diagram depicting an example method 700 for playback of an input log in accordance with an example embodiment of the present invention. As described above, various actions may be taken once the input log has been recorded. One such action is playback of the input log to recreate the actions recorded in the log. These actions may be played back according to context also recorded in the input log. In this manner, the events and actions of the input log may recreate an application state that corresponds to the application during which the log was recorded, rather than merely mimicking device input. In some embodiments, playback is performed via a playback application, such as the playback application 402, which provides an interface for selection of particular events for playback, selecting a particular start or stop time for playback, and/or rewinding or fast-forwarding playback.

Playback of input logs advantageously allows for accurate recreation of an application state, allowing the viewer to follow along with operations taken by the recorded user as they were originally performed. Unlike previous methods of playing back input, by recording application contexts and events, a more accurate representation of the actions taken by the original user may be observed. For example, in the case of a medical imaging viewing and analysis operation, the viewer may be able to follow along with the user performing a diagnostic operation. In this manner, the viewer can critique and analyze the process performed by the original user, such as to determine whether the original user may have missed a step or action during the diagnostic process. This may be of particular user in evaluating if the original user followed a particular process or procedure, and whether they performed said actions in accordance with an expected skill level.

Playback in this manner may also provide advantages in troubleshooting operations. For example, if an error is occurring in an application, an input log that results in the error may be played back to allow a troubleshooter to recreate the error for correction. The troubleshooter may activate and deactivate certain actions to determine which actions are the cause of the error. For example, logs that only record device input may not provide sufficient data to allow for accurate recreation of the problem condition, while recording particular events that occur in the application as a result of the input may be much more likely to allow the troubleshooter to reproduce the error state of the application.

At action 702, an input log is selected for playback. As described above, the input log may be selected via a playback application. The selected input log may be associated with metadata, such as a particular application session, user account, application, file, or the like. This metadata may be selected when the input log is selected. For example, if the input log relates to viewing and analysis of an image file, then a copy of the image file may be stored along with the input log, or as part of the input log. The input logs may be presented in a list or via another selection process. For example, each input log may be associated with a file, and the user may select the log by selecting the file in a file browser or from a menu. Selection of the input log may launch the playback application and one or more applications associated with the input log. For example, if the user selects an input log associated with an image, then an image viewing application may be launched upon selection of the input log. In some embodiments, launching of the associated application may be performed by the playback application.

At action 704, application events are determined from the input log. The playback application may process the input log to determine which events occurred, when the events occurred, and in what application context the events occurred. This determination may be performed by accessing application specific data, such as a set of action or event definitions associated with each application. For example, a particular application may include a list of events and contexts associated with those events. An imaging application might include defined events for opening an image, zooming the image, scrolling the image, changing brightness and contrast settings, and annotating the image. The playback application may use these action definitions to interpret the commands and input operations that should be associated with each event during playback. Additionally or alternately, this process of associating input log data with events may be performed by the application to perform the input. For example, the playback application may send raw event data to the receiving application and the receiving application may recreate the events.

At action 706, the receiving application is instructed to replay the events based on the events identified at action 704. As described, playback may include sending messages to the application (e.g., if the application is configured to accept commands from the playback application), or by mimicking device input to cause the same events to occur in the application.

FIG. 8 is a flow diagram depicting an example method 800 for performing a training operation using an input log in accordance with an example embodiment of the present invention. Input logs may also be recorded for training purposes. A teacher may record input during a demonstration in order to provide a demonstration of the proper way to perform an action. For example, a trained radiologist may record their actions when diagnosing a particular image to demonstrate to a resident the proper diagnosis procedure. In addition to direct recording of the application events as described above, additional training semantics may be associated with the recording. The method 800 provides for use of the input log to derive inferences about the lesson from the actions and events stored in the input log. Particularly, an application may process the recorded actions to determine time-related and/or content-related information for the action sequence used to instruct the student. This information provides various possibilities for enhancing the learning experience.

At action 802, an input log is recorded for the training operation. In some embodiments, the input log may be pre-recorded and selected at action 802 to be associated with training information. This may be accomplished by, for example, indicating a particular flag during the recording process, or by selecting a pre-recorded log in a training application.

At action 804, training semantics are determined from the input log. A playback application may determine that the input log relates to a particular use of the application (e.g., a particular interface window), or a particular subject matter (e.g., a particular image context). For example, if the application is a medical image viewing application, the application may determine that the input log is associated with a particular medical image (e.g., x-ray, CT scan, magnetic resonance image), and/or a particular part of the body (e.g., back, chest, arm) by analyzing event contexts stored in the log. The application may thus annotate the input log with references (e.g., annotations, image overlays, hyperlinks, a separate notes document) relevant to the learning process. For example, if the original recording relates to an x-ray of an arm, the recording process may indicate that the viewing event contexts are associated with an arm image in an x-ray format. When analyzing the input log to determine the training semantics, the playback application may determine that the image is an x-ray of an arm, and provide the viewer with a link to notes on diagnosing fractures in the arm. Various other rules and analysis techniques may also be applied to derive application semantics from contextual information stored in input logs. For example, text input from user annotations might be used to identify relevant terms for links to medical dictionaries, or text-to-speech input might be applied to associated dictations to extract relevant terms as a basis for providing viewers with additional information. Image processing/recognition techniques & algorithms may be employed to identify characteristics of a medical image. For example, a spine image could go be processed to determine the location of vertebrae, as well as the distance between them. An algorithm indicating when the vertebrae distance may cause a pinched nerve could be used to show additional information during teaching playback. As another example, an electrocardiogram image can be analyzed for abnormal heart rhythms, and a notation applied to the image to identify the abnormal rhythm during training playback.

The events contained within the training input log could also be used to extract useful information for training. For example, a set of menu/shortcut commands in a training input log may be known to bring up a particular hanging protocol or to configure the display in some way, and the training log may be analyzed to identify these sets of commands. During training playback various helpful suggestions (e.g., text indicating "use a hanging protocol that highlights this particular image feature"), highlight/focus indicators (e.g., place a graphical circle around the selected menu item), references (e.g., provide link to a hanging protocol section in help file), or the like could be employed to add training annotations during playback of the training input log. Various anonymized and/or aggregated demographic and/or electronic medical record data associated with the medical image could also be used to derive useful training information. In some embodiments, the location (e.g., geographical, hospital, department) of the patient, procedure(s), diagnosis, or the like may be used in extracting training information. The location may be derived implicitly (e.g., using a GPS receiver) or explicitly (e.g., entered by the user). For example, if a particular image is associated with a location in Australia, during training playback, the application might provide information referencing a species of plant indigenous to Australia that was the cause of an abnormality presented in the image. Differing locations may provide useful training playback information. If the patient was situated in a hospital in Bellevue, Wash., but the procedure was performed in Dallas, Tex., the training playback may be able to determine this and provide relevant links/info based on this fact (e.g., perhaps it is known that for brain exams, the Bellevue, Wash. hospital cannot handle scans of a particular type/specialty, but the Dallas, Tex. hospital can).

At action 806, playback of the log may be initiated. In some embodiments, the user may select playback with training semantics or annotations to be enabled. When the training semantics option is selected, playback of the log may be accompanied by the training semantics identified at action 804. In some embodiments, the training semantics may be dynamically determined during playback, such that a separate action is not required to determine the training semantics when viewing an input log for playback in a training format.

At action 808, the input log is played back with training semantics enabled. As described above, this may include providing annotations on a display of the application associated with the input log, providing a separate window with information associated with the actions being taken in the playback, providing a printout with notes, providing an audio track to accompany the playback, or any other audio or visual method of providing additional training information to a user playing back an input log.

FIG. 9 is a flow diagram depicting an example method 900 for performing a testing operation using an input log in accordance with an example embodiment of the present invention. In addition to enabling accurate playback of recorded application events, the use of context-aware input logs also provides users with the increased accuracy in evaluating the performance of other users based on known "good" input. For example, an instructor may record a set of input operations that are known to be successful, such as a process flow for analyzing a medical image to diagnose a problem. The input log associated for this instructor input may be compared against an input log generated by a student to determine whether the student successfully followed procedure.

At action 902, a known correct input log is received. For example, an instructor may perform a series of diagnostic steps on an image, and indicate that the particular input log is a "control" or "known good" set of input. Alternatively, the instructor may select an input log from a list of input logs. The input log selected in this manner may be used as an answer key for comparison of test input logs. As with other input logs described above, the known correct input log may include application contexts, semantics, events, and the like, to provide a large degree in granularity in using the known correct input log as an answer key.

The instructor may also provide supplementary data to the known correct input log. This supplementary data may include annotations for certain actions so that when a test taker receives a score, annotations for actions that the test taker does not perform are included in the scoring report. For example, in a medical imaging analysis operation, the instructor may provide notes for particular anomalies that should have been identified on the image by the test taker, with details on what the test taker should look for to identify those anomalies in the future. The instructor may also provide supplementary data about the test, such as test instructions, questions, timing information, a scoring system, and the like. In some embodiments, the input log may be automatically associated with notes or other data based on data received during the recording of the input log. The input log may extract information about a particular view or anatomy object (e.g., from a Digital Imaging Communications in Medicine (DICOM) standard image), and associate the input log with the extracted information. For example, if the input log records that an image to be used for a test is a chest x-ray of a particular contrast value, then a computing device may determine that the image is being used for a pulmonary or cardiac illness, and links to reference information for these types of illness may be associated with the input log for review when taking the test or viewing the results. Various other rules and relationships may also be defined for such automatic association, such as by extracting text values, examining file metadata, and the like. Text and images may be used to perform searches of reference materials or the Internet, and relevant results may be associated with the input log for use during and after testing.

At action 904, a test input log is recorded. The test input log may be generated by a student or other person who is being tested for comparison against the known correct input log.

Aspects of the disclosure may provide a test interface for entry of the test log. For example, a user may indicate they are ready to begin the test, indicate which test they wish to take, and the like. The test interface may also provide information relevant to the test taker, such as an elapsed time and a question number. The test interface may also display other information relevant to the user taking the test, such as test instructions, test questions, or reference materials. The test interface may also ensure that the user is unable to access information outside of the test interface, to prevent cheating or other interference in the testing process.

The test input log may be associated the same information as the known correct event log. For example, the test taker may be presented with the same image that was analyzed by the instructor, with the expectation that the test taker will mimic the input provided by the instructor. As with the other input logs described above, application context, semantics, events, and the like may be recorded as part of the test log, thus providing additional information for use in evaluating the test taker other than direct device input logs.

At action 906, deviations are identified between the known correct input log and the test input log. In order to evaluate the test taker's performance, the test taker's input log is compared to the instructor's input log. This comparison may identify deviations, such as actions performed by the instructor but not performed by the test taker, and vice versa. These deviations may be associated with the presence or absence of particular application events, contexts, and semantic entries. By providing additional data beyond raw device input, intelligent comparison across input log is possible. For example, if the test taker is annotating a medical image, and the test taker draws a circle that is slightly displaced and of a slightly different size than an annotation in the known correct input log, then the comparison of these input logs may allow for partial credit to be assigned. By being aware of the application semantics, events and application operations tracked in the input log may be analyzed with increased granularity.

For example, the test input log may be analyzed to determine that the test taker was correct in that they performed a "draw circle" event, and the circle was nearly of the correct location and area, but not exact, analysis of deviations based on the stored data in the input log may determine that, while deviating from the known correct input log, the test taker was mostly correct. Various other criteria may be analyzed to identify deviations between the instructor and test taker logs. For example, if measurement (e.g., distance) annotations differ, measurement deviations and the instructor/test taker's environment may be used to determine whether to give them some leeway on differences, and thus higher marks. For example, consider an examination where a spine image diagnosis requires 3 measurement annotations of 5 cm, 7 cm, and 9 cm, but the test taker has entered 6 cm, 8 cm, and 10 cm. By direct comparison, the test taker would get everything wrong. Consideration of the entries in light of the context, however, may indicate a pattern where the deviation for each measurement was 1 cm off, potentially indicating that there might be a reason for the measurement errors. Consequently, a test taker may be awarded partial marks if it is determined that their measurements were negatively affected by something, such as a system calibration setting. For instance, the instructor screen resolution may have been 2000×1000, while the test taker screen resolution was only 800×400. Given the difference in resolution, it may be determined that the test taker was correctly performing the measurements, but was negatively influenced by their workstation environment Where the test taker's annotations are different than the instructor's, deviation analysis could be used for partial marks. For example, if the correct annotation for a given image would be "tumor", with a defined synonym of "abnormal tissue growth", if the test taker entered either of these, then the test taker would be awarded full marks. However, if the test taker entered "dark spot", it is an open question as to whether the test taker knew the correct diagnosis and just not know the correct annotation/text, or if they missed the mark and misdiagnosed the abnormality. In such a scenario, other actions in the log could possibly be used to deduce what the test taker was really indicating. If the test taker performed searches, viewport changes, etc. that strongly indicate that the test taker thought the abnormality was a tumor, the test taker might be awarded partial credit. If there is a strong indication that the test taker did not think it the abnormality was a tumor, then credit might not be awarded.

Even if a test taker does not setup a hanging protocol or display in the exact same manner as the instructor, it is possible the test taker should not be penalized. As an example, an instructor may create an arm diagnosis training exam that requires changing the display to have a view port with 200% zoom. The test taker may not change their display though, and leave the zoom at 100%, but still successfully provide the diagnosis. If the particular training was testing both the diagnosis and the hanging protocol/display configuration, then the test taker would appear to have missed the display configuration. However, the deviation of the zoom level value taken in conjunction with the different monitor resolutions may be used to determine that the test taker did not need to change the zoom value because their resolution was double that of the instructor's.

In some cases, a diagnosis test may include the element of time as part of the scoring process. For example, an instructor may be testing how responsive/quick a test taker is and/or testing how a test taker handles a critical/emergency diagnosis. In these cases, while the accuracy of the diagnosis may account for the majority of the scoring, the time a test taker takes for total, partial, or single events in the test playback may negatively affect the score. For example, for a head diagnosis, a test taker may accurately repeat all steps or actions of a diagnosis, but to setup the hanging protocols (assume a series of 5 events) the test taker took 2 minutes versus a time of 30 seconds for the instructor. In this case, the time deviation could be used to subtract points from the test taker. It may be possible for a test taker to have the correct diagnosis, but perhaps not perform steps/order in the ideal/optimum way. In this case, an instructor may wish to deduct from the test taker's score.

At action 908, identified deviations may be used to evaluate the test taker. The test taker may be presented with a scoring report, identifying actions that the test taker failed to perform that were included in the known correct input log, or vice-versa. The scoring report may include an analysis of which actions the test taker failed to perform correctly, such as by providing the test taker with supplemental information associated with those actions at step 902. The test taker may receive a score based on their input actions, with scoring weight established by the instructor during recording of the known correct input log, or at another time when creating parameters for the test. The test taker may also be presented with suggestions for improvement based on supplemental data associated with actions that deviate from the known correct input log. In some embodiments, the test taker may be presented with statistical data for other users, where the statistical data is derived from input logs provided from other users. For example, in a medical imaging application, the test taker may be notified that they failed to zoom or pan to an important region of interest, that they failed to look at prior images associated with the patient, that they failed to use a cross-sectional view of the patient, or the like.

FIG. 10 is a flow diagram depicting an example method 1000 for deriving input analytics from one or more input logs in accordance with an example embodiment of the present invention. In addition to using input logs to identify behaviors of individual users of the applications, the input logs may be analyzed in aggregate to identify trends and behaviors across the multiple users for the purpose of usage profiling, workflow improvement, application development, and the like. For example, analytical data may be derived that indicates how frequently users use a certain feature, the average delay time between user commands for particular actions, the most common usage patterns for a particular workflow, correlations between specific commands and certain users or workflows, unexpected usage patterns, and the like.

Analytical data may also be derived for particular users or groups of users. For example, input logs may be associated with particular user accounts or other identifiers. These input logs may be analyzed to determine characteristics of the user's performance. For example, the analytical data may be used to derive the number of times a particular diagnosis has been performed by a particular user that involved a mismatched workflow synchronization, the amount of time taken by a particular user on average for a scroll operation, a display protocol change, or a distance annotation, or the like. Data may also be derived for groups of users. For example, a query may provide event data for all users that added a particular annotation type to an image type (e.g., data relating to all radiologists who added an elliptical annotation around a dark spot for an arm diagnosis using a viewport zoom factor less than 100%).

At action 1002, input logs are recorded as described above. For example, an application may aggregate input logs for all users of a particular system. These input logs may be classified based on the particular user, the particular workflow, or the like. In some embodiments, users may "opt in" to providing input log data for this purpose, where the user selects an interface option allowing recording of the input log for submission to the analysis process.

At action 1004, the input logs are analyzed and cross-referenced with one another to mine for relevant data. The analysis process may include identifying the frequency of particular application events and contexts, identifying when events and contexts are performed in relation to one another, or the like. In some embodiments, the analysis may determine how frequently users use a particular feature. For example, the analysis process may identify whether assumptions about the action (e.g., by the application designers) are in line with how often the user actually performs the action by looking at the occurrences of the particular action across many users and application instances. As an example, analytics may determine that each user used a newly introduced "square" image annotation feature 5 times in the span of 6 months, with 80% of the occurrences in the first two weeks of introduction. An application developer might use such statistics to determine that the feature has not been used as much as expected, prompting the developer to follow up with users to determine why.

In some embodiments, the delay time between inputs may be determined. Such delays may be indicative of usability issues (e.g., long lag times between two commonly used consecutive commands). Tracking of these delay times may allow for pinpointing of such issues so that they may be addressed by application developers. These delays may be determined from the input logs by looking at the average difference between time points for specified actions. For example, if the time between changing the viewport layout and adding an image series to the viewport of a medical imaging application is 5 seconds, this may be indicative of a usability issue with the two commands.

In further embodiments, application usage patterns for particular workflows may be identified. By identifying patterns in user behavior, an application developer may be able to identify the most efficient ways to improve the user experience. For example, analytical data derived from input logs may indicate that a change of brightness and contrast is performed by users in 99% of head trauma diagnoses, for all other diagnoses, these contrast and brightness changes may only be performed 35% of the time. As such, an application developer might provide features that allow the user to automatically adjust brightness and contrast to a specified level in the case of head trauma diagnoses.

In yet further embodiments, aggregate input log data may be compared to expected input log data. This comparison may be used to determine the validity of assumptions of user behavior patterns used by application developers, to ensure that users are using the application as expected, allowing the developers to provide the most efficient interface possible.

At action 1006, the results of the analytics are provided. As described above, these analytics may indicate a variety of data about user inputs, such as correlations of certain input with certain workflows, the presence or absence of certain commands, whether the inputs match developer expectations, and the like. These analytics may be presented in a variety of formats, such as a report, a spreadsheet, a database, or the like. In some embodiments, the input logs are aggregated and provided as a set of database tables against which a user or developer may generate queries for particular data.

In some embodiments, events may be transmitted for analysis in real-time, providing real-time analytics of input events. This real-time analysis may be used for a variety of purposes. For example, a real-time display may provide a user with a view of all events that are occurring on one or more systems that are transmitting input events. Such a system may be used to detect and diagnose system problems, such as a sudden logout event of all users being indicative of a system crash, and the like.

The system may also provide for selection and visualization of input log data and analytic data derived from the input logs. As described above, the input log data may be received and visualized in real-time. The system may allow for particular logs or groups of logs to be selected for viewing and analysis. For example, a set of logs associated with a particular image may be selected as multiple users examine the image, input from multiple users may be compared in a side-by-side or overlaid manner, or all input logs associated with a particular entity (e.g., a particular patient or imaging device) may be examined and/or analyzed upon selection. In some embodiments, the input logs may be associated with data such as user identities. Such log metadata may be used in real-time data analysis techniques. For example, a user may note that events are being received for a particular image or a particular imaging device, and note the identity of the user performing the events based on a user identifier associated with the input log. Such real-time analysis may also be used to perform messaging between users, such as to indicate to a first user that a second user is also accessing the same application or file (e.g., two radiologists viewing the same medical study at different locations).

FIG. 11 is a flow diagram depicting an example method 1100 for receiving collaboration input using an input log in accordance with an example embodiment of the present invention. By capturing input log data, aspects of the disclosure may also enable collaboration between users located remotely. Input may be recorded, transmitted, and executed on a substantially similar application instance to allow a first user at a first location to collaborate with a second user at a second location. For example, a first user and a second user may be viewing the same medical image in medical imaging applications at two different locations. The medical imaging applications may have the capability to synchronize with one another to enable viewing of the same image. Input from the first user at the first location may be recorded and transmitted to the second location, where it may be executed to enable the second user to view the same interface as the first user, or vice-versa.

The collaboration system described with respect to FIG. 11 may be employed in a one-to-many collaboration environment, or in a many-to-many setting. In the one-to-many environment, a single user may have their input replicated to one or more other application instances, such as a case where a first user provides input and other users are able to view the input in a read-only environment. For example, a single radiologist could diagnose a malady from a medical image, with other radiologists following the first radiologist's inputs and offering review, feedback, comment, or the like. In a many-to-many environment, user input from each application instance may be replicated to the other application instances as appropriate. For example, each user may provide input which is transmitted to a single interpreter or server, and propagated to each individual display.

At action 1102, input is received, as described above with respect to FIGS. 2, 3, and 6. The event may include application context information, semantics, or the like. The event may be converted to an event log format at action 1104. At action 1106, a determination is made as to whether the event is suitable for a collaboration environment.

Some events may be indicated as "locked" from collaboration, and thus unable to be propagated to other application instances. For example, some actions may be associated with the particular user's application instance, and thus these actions are not relevant for propagation. As an example, a user may be in a brightly lit room, and thus need to adjust image contrast accordingly to allow for clear viewing of an image. Other users at different locations may have different lighting conditions, and thus it may not be appropriate to propagate change in image contrast performed by the first user. Such actions may be marked as "locked", as there would be no reason to adjust the contrast on the displays of other users. In some embodiments, a user may select a particular action as collaboration-locked. For example, the user may hold down a particular modifier key or select a particular interface option to prevent a particular action from being sent to other users. Alternatively, the user may perform the particular action or modifier key to transmit the action to the other users, such that actions are collaboration locked by default, and only sent when explicitly indicated by the user.

At action 1108, if the event is not locked for collaboration, the event is propagated to the other application instances. The event may be propagated as an input log, or as a separate event. In some embodiments, the event may be received for playback by the second application as if it was received from a playback application executing on the local machine. In this manner, the users of the other application may have their interface updated in accordance with the input operation performed on the first application interface. An example method for performing the action is described further below with respect to FIG. 12.

FIG. 12 is a flow diagram depicting an example method for providing collaboration among multiple devices using a collaboration input in accordance with an example embodiment of the present invention. As described above with respect to FIG. 11, input events that are recorded may be used in a collaborative environment to propagate said events from a first application instance (e.g., a user running the application at a first location) to one or more second application instances (e.g., users running their own application instances at different locations). FIG. 12 depicts a method for receiving such input events and executing the events to replicate the environment of the application that provided the event.

At action 1202, an input log corresponding to input received on another application is received. The input log may be provided as a single event, or as a series of events. The input log may be received by an event interpreter as described with respect to FIG. 2, or by an application directly. The event may include an event type, along with one or more contexts and sets of application semantics associated with the event.

At action 1204, input is derived from the input log received at action 1202. The derivation of input may include processing by an event interpreter to convert the event into a format that is executable by the application on the local computer. The event input may be created by the same or a similar process to that of playing back an input log, as described above with respect to FIG. 7.

At action 1206, the derived event input may be executed by the application to implement the collaboration environment. For example, the end result may be that the same events that were recorded on a first application instance are played back on a second application instance, allowing users of the first application and the second application to collaborate with one another.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a notification of at least one application event from an application, the application event occurring in response to a user input to the application, and the notification comprising an event type and at least one application context related to the application event;
   receiving a time value associated with the application event;
   converting, using a processor, the notification and the time value into an entry in an input log;
   receiving a selection of at least one notification stored in the input log;
   extracting one or more notifications and time values from the input log, wherein extracting the one or more notifications and time values comprises skipping the selected notification;
   determining an event and an event context for execution based on the one or more extracted notifications and time values;
   generating an instruction for the application comprising the event and the event context; and
   sending the event to the application for execution.

2. The method of claim 1, wherein the application is a medical imaging application.

3. The method of claim 1, wherein the application context comprises data indicating the state of the application pertaining to the particular event type.

4. The method of claim 1, further comprising:
   determining a set of training semantics based on the input log; and
   providing the training semantics to a user during playback of the input log.

5. The method of claim 1, wherein the input log is a known correct input log, and the method further comprises:
   recording a test input log;
   identifying deviations between the test input log and the known correct input log; and
   evaluating the test input log based on the identified deviations.

6. The method of claim 5, wherein evaluating the test input log comprises generating a score report based on scoring values assigned to the events and event contexts of the known correct input log.

7. The method of claim 6, further comprising:
   identifying reference materials based on the identified deviations; and
   providing the reference materials as part of the score report.

8. The method of claim 1, further comprising:
   receiving a plurality of additional input logs, each of the plurality of input logs comprising a plurality of notifications and time values; and
   analyzing the plurality of additional input logs to determine a set of user analytics, the user analytics identifying the frequency with which at least one of events and event contexts occur across the plurality of additional input logs.

9. The method of claim 1, further comprising transmitting the input log to a remote computer for playback.

10. The method of claim 9, further comprising:
    identifying at least one event in the input log as collaboration-locked; and
    avoiding transmission of the collaboration-locked event in the input log transmitted to the remote computer for playback.

11. The method of claim 1, further comprising generating the input log by:
    generating an event for the notification, wherein the event comprises the event type and at least one application context from the notification;
    associating the time value with the event;
    determining at least one event action using the at least one application context;
    determining at least one action context using the at least one application context; and
    storing the event, the time value, the at least one event action, and the at least one action context in the input log.

12. An apparatus comprising processing circuitry configured to:
    receive a notification of at least one application event from an application, the application event occurring in response to a user input to the application, and the notification comprising an event type and at least one application context related to the application event;
    receive a time value associated with the application event;
    convert the notification and the time value into an entry in an input log;
    receive a selection of at least one notification stored in the input log;
    extract one or more notifications and time values from the input log, wherein extracting the one or more notifications and time values comprises skipping the selected notification during the extracting;
    determine an event and an event context for execution based on the one or more extracted notifications and time values;
    generate an instruction for the application comprising the event and the event context; and
    send the event to the application for execution.

13. The apparatus of claim 12, wherein the processing circuitry is further configured to:
    generate an event for the notification, wherein the event comprises the event type and at least one application context from the notification;

associate the time value with the event;
determine at least one event action using the at least one application context;
determine at least one action context using the at least one application context; and
store the event, the time value, the at least one event action, and the at least one action context in the input log.

14. The apparatus of claim 12, wherein the apparatus is a medical imaging device.

15. The apparatus of claim 12, wherein the processing circuitry is further configured to transmit the input log to a remote computer for playback.

16. A method comprising:
receiving an input log, the input log comprising one or more events and application contexts relating to input performed on a remote computer;
determining, using a processor, at least one event and at least one event context for execution from the input log by at least:
receiving a selection at least one notification stored in the input log;
extracting one or more notifications and time values from the input log, wherein extracting the one or more notifications and time values comprises skipping the selected notification during the extracting; and
determining an event and an event context for execution based on the one or more extracted notifications and time values;
generating one or more instructions based on the at least one event and at least one event context; and
executing the generated one or more instructions to cause an application to perform the input originally performed on the remote computer.

17. The method of claim 16,
generating an instruction for the application comprising the event and the event context; and
sending the event to the application for execution.

* * * * *